United States Patent [19]
Nara

[11] Patent Number: 5,168,151
[45] Date of Patent: Dec. 1, 1992

[54] PORTABLE ELECTRONIC DEVICE HAVING A MEMORY WITH RESTRICTED ACCESS IN OFF-LINE MODES

[75] Inventor: Seietsu Nara, Yokohama, Japan

[73] Assignee: Kabushiki Kaisha Toshiba, Kawasaki, Japan

[21] Appl. No.: 533,880

[22] Filed: Jun. 6, 1990

[30] Foreign Application Priority Data

Jun. 12, 1989 [JP] Japan .................................. 1-148994

[51] Int. Cl.$^5$ ............................................ G06F 15/21
[52] U.S. Cl. .................................. 235/492; 235/380; 235/382
[58] Field of Search ................ 235/492, 380, 382, 375, 235/487

[56] References Cited

U.S. PATENT DOCUMENTS

| | | | |
|---|---|---|---|
| 4,572,946 | 2/1986 | Schrenk | 235/492 |
| 4,754,418 | 6/1988 | Hara | 235/380 |
| 4,767,920 | 8/1988 | Kitta | 235/487 |
| 4,777,355 | 10/1988 | Takahira | 235/380 |
| 4,804,825 | 2/1989 | Bitoh | 235/492 |
| 4,816,653 | 3/1989 | Anderl | 235/382 |
| 4,816,654 | 3/1989 | Anderl | 235/382 |
| 4,827,111 | 5/1989 | Kondo | 235/492 |
| 4,827,512 | 5/1989 | Hirokawa | 235/487 |
| 4,887,234 | 1/1989 | Iijima | 235/492 |
| 4,920,256 | 4/1990 | Marty | 235/492 |
| 4,973,828 | 11/1990 | Naruse | 235/492 |
| 4,983,816 | 1/1991 | Iijima | 235/492 |

FOREIGN PATENT DOCUMENTS

| | | | |
|---|---|---|---|
| 0018889 | 12/1980 | European Pat. Off. . | |
| 0167044 | 8/1986 | European Pat. Off. . | |
| 3628253 | 2/1988 | Fed. Rep. of Germany | 235/380 |
| 3811831 | 3/1988 | Fed. Rep. of Germany . | |
| 2591008 | 5/1987 | France . | |
| 0019277 | 1/1985 | Japan | 235/382 |
| 0048555 | 3/1985 | Japan | 235/380 |
| 0162183 | 7/1987 | Japan | 235/487 |
| 2191029 | 12/1987 | United Kingdom | 235/492 |

Primary Examiner—Robert Weinhardt
Attorney, Agent, or Firm—Cushman, Darby & Cushman

[57] ABSTRACT

An IC card having a CPU and a memory is used in on-line and off-line modes. The memory has a nonrewritable first memory area for storing a basic function, and a rewritable second memory area capable of storing a user application program. The IC card includes a circuit for switching between enabling and disabling accesses to the second memory area in response to the mode of the on-line and off-line.

23 Claims, 4 Drawing Sheets

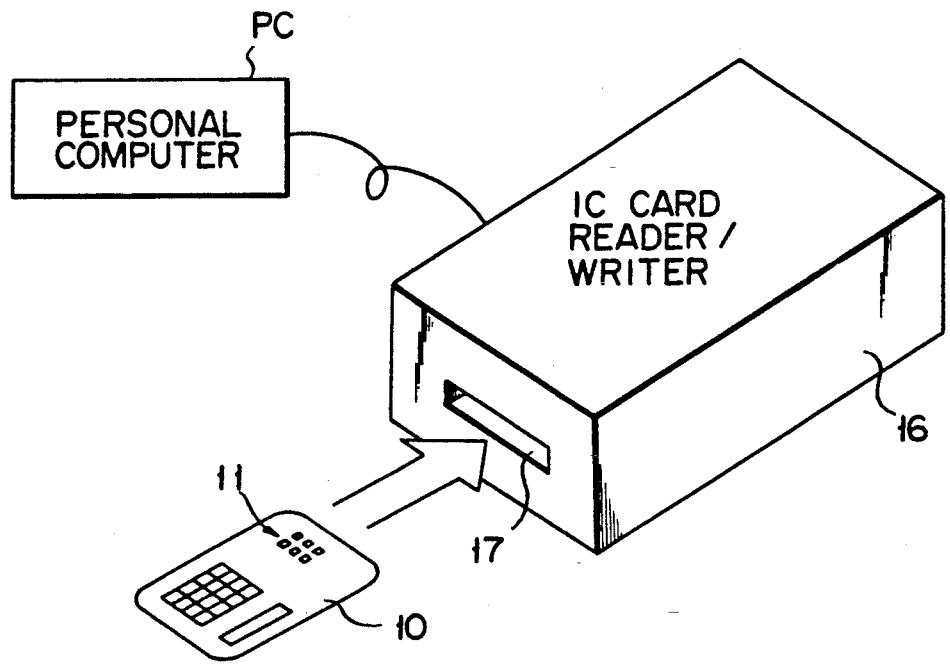
F I G. 3
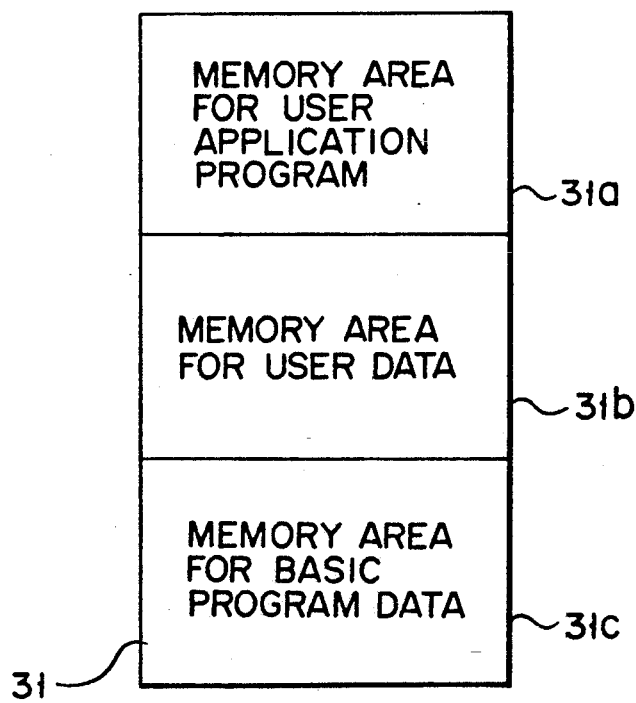
F I G. 4

PORTABLE ELECTRONIC DEVICE HAVING A MEMORY WITH RESTRICTED ACCESS IN OFF-LINE MODES

BACKGROUND OF THE INVENTION

1. Field of the Invention

The present invention relates to a multifunctional portable electronic device such as an IC card, which incorporates, e.g., a CPU, a data memory, a built-in battery, and the like, and is used in a stand-alone mode to provide an electronic calculator function, a time display function, and the like, and is inserted in a terminal in use.

2. Description of the Related Art

Conventional, multifunctional IC cards have been developed. An IC card of this type incorporates a CPU (control element), a data memory, and the like, has a keyboard, a display unit, and the like, and is solely used to provide an electronic calculator function, a time display function, or the like, or is inserted in a terminal in use. The CPU, the data memory, and the like are incorporated as an LSI chip.

In an IC card of this type, a program is developed according to specifications presented by a customer, and thereafter, programming, debugging, tests, and the like are performed. Then, the manufacture of a new LSI chip is started from design of a mask. In this case, basic functions are stored in a program memory comprising a mask ROM.

For this reason, every time specifications are changed or a new function is added, an LSI chip must be manufactured, resulting in high cost of the LSI chip, i.e., an IC card. In addition, a development period (mainly for a program) is undesirably prolonged.

SUMMARY OF THE INVENTION

It is an object of the present invention to provide a portable electronic device which can prevent an increase in cost, and can shorten a development period.

A portable electronic device of the present invention comprises a control element, and a memory means, and is used in an on- or off-line mode. The memory means has a nonrewritable first memory area for storing basic functions of the device, and a rewritable second memory area for storing a user application program. Access to the second memory area is enabled in the on-line mode but is disabled in the off-line mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 5 are views for explaining an embodiment of the present invention, in which:

FIG. 1 is a schematic block diagram showing an arrangement of an electrical circuit of an IC card;

FIG. 2 is a plan view showing an arrangement of the IC card;

FIG. 3 is a perspective view showing a terminal for the IC card;

FIG. 4 shows a memory map of a data memory; and

FIG. 5 is a circuit diagram showing an arrangement of a memory controller.

DETAILED DESCRIPTION OF THE PREFERRED EMBODIMENTS

An embodiment of the present invention will be described below with reference to the accompanying drawings.

Figure 2:
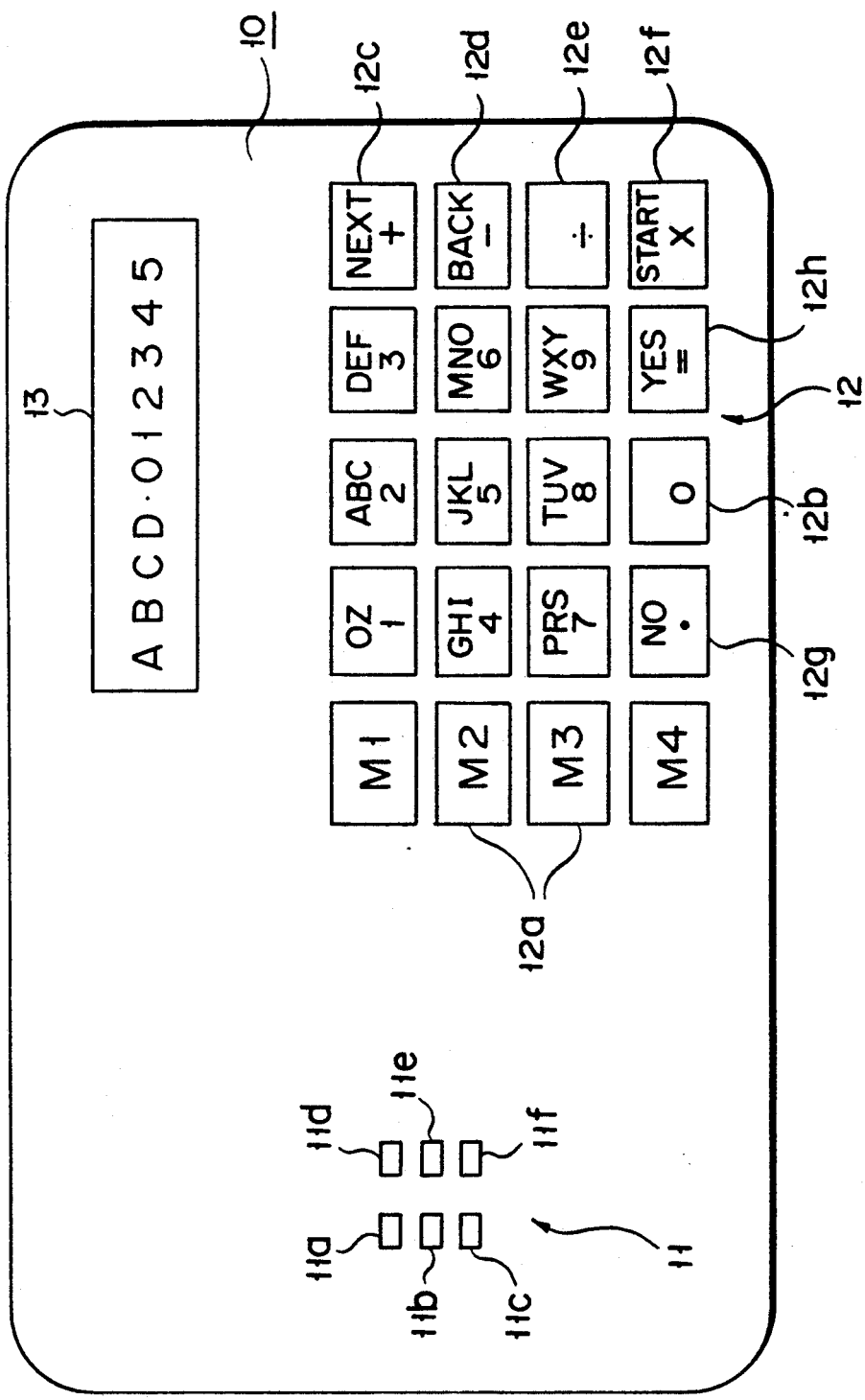

In FIG. 2, reference numeral 10 denotes an IC card as a portable electronic device, which is a multifunctional IC card having various functions (applications). For example, IC card 10 has an on-line function (on-line mode) used with a terminal (not shown), an off-line function (off-line mode) in which IC card 10 is solely operated, and a standby state wherein only a timepiece function is enabled.

The off-line function includes an electronic calculator mode in which the card can be used as an electronic calculator, a clock mode for displaying a time of a timepiece for a user, an electronic note (memorandum) mode in which addresses, names, telephone numbers, and the like are registered or read out, and a purchase mode in which IC card 10 is utilized as a plurality of kinds of credit cards. Thus, IC card 10 can be used in a stand-alone mode during this mode of function.

In the purchase mode, IC card 10 stores a balance, a valid date, purchase records, and the like. Upon every purchase, a purchase amount is subtracted from the balance stored in IC card 10 and purchase information is recorded. When the balance in IC card 10 becomes zero or the valid date expires, a secret code is issued from a contract bank, thus updating the contents of the IC card.

Contacts portion 11 are arranged at a position designated by the standards of a card, on the surface of IC card 10. Further, keyboard 12 which includes 20 keys, and display unit 13, arranged on a surface portion above keyboard 12 and formed of liquid crystal elements, are arranged on the surface of IC card 10.

Contacts portion 11 includes a plurality of terminals 11a to 11f, i.e., an operation power supply voltage (Vcc, +5 V) terminal, an EEPROM write power supply voltage terminal (Vpp, +12 V to +24 V), a ground terminal, a clock signal terminal, a reset signal terminal, and a data I/O terminal.

Keyboard 12 includes selection keys (M1, M2, M3, and M4) 12a for selecting processing operations corresponding to kinds of card, i.e., various credit cards, cash cards, and the like, ten-key pad 12b, four-arithmetic rule keys, that is, addition (+) key 12c, subtraction (−) key 12d, division (÷) key 12e, multiplication (x) key 12f, decimal point (.) key 12g, and equal (=) key 12h.

Addition key 12c is used as a NEXT key, i.e., a mode selection key for selecting a mode during a display of a date and time in the off-line mode. Subtraction key 12d is used as a BACK key, i.e., a key for returning a display state of display unit 13 to a previous state. Multiplication key 12f is used as a start key. Decimal point key 12g is used as a NO key or an end key. Equal key 12h is used as a YES key or a power-on key.

When equal key 12h is depressed as the power-on key, a CPU (to be described later) is released from a HALT state, and causes display unit 13 to display time and date as an operation start message.

In this state, when keys of ten-key pad 12b are depressed, IC card 10 is set in the electronic calculator mode, and four arithmetic operations can be performed.

Addition key 12c as the mode selection key is used as a key for advancing the display state of display unit 13 which is displaying date and time to another mode. Every time addition key 12c is depressed, the electronic memorandum, time set, date set, purchase transaction modes, and the like are displayed on display unit 13 as a menu. When these modes are executed, equal key 12h is depressed as the YES key. Thus, the selected mode can be executed.

Display unit 13 is a 16-digit display, each digit of which has a 5×7 dot matrix.

FIG. 3 shows an outer appearance of IC card reader/writer 16 connected to a terminal dealing with IC card 10 (e.g., a personal computer). More specifically, reader/writer 16 is electrically connected to contacts portion 11 of IC card 10, when inserted from card slot 17, and reads or writes data from or in a memory of IC card 10.

IC card reader/writer 16 is connected to a main body of personal computer PC through a cable.

Figure 1:
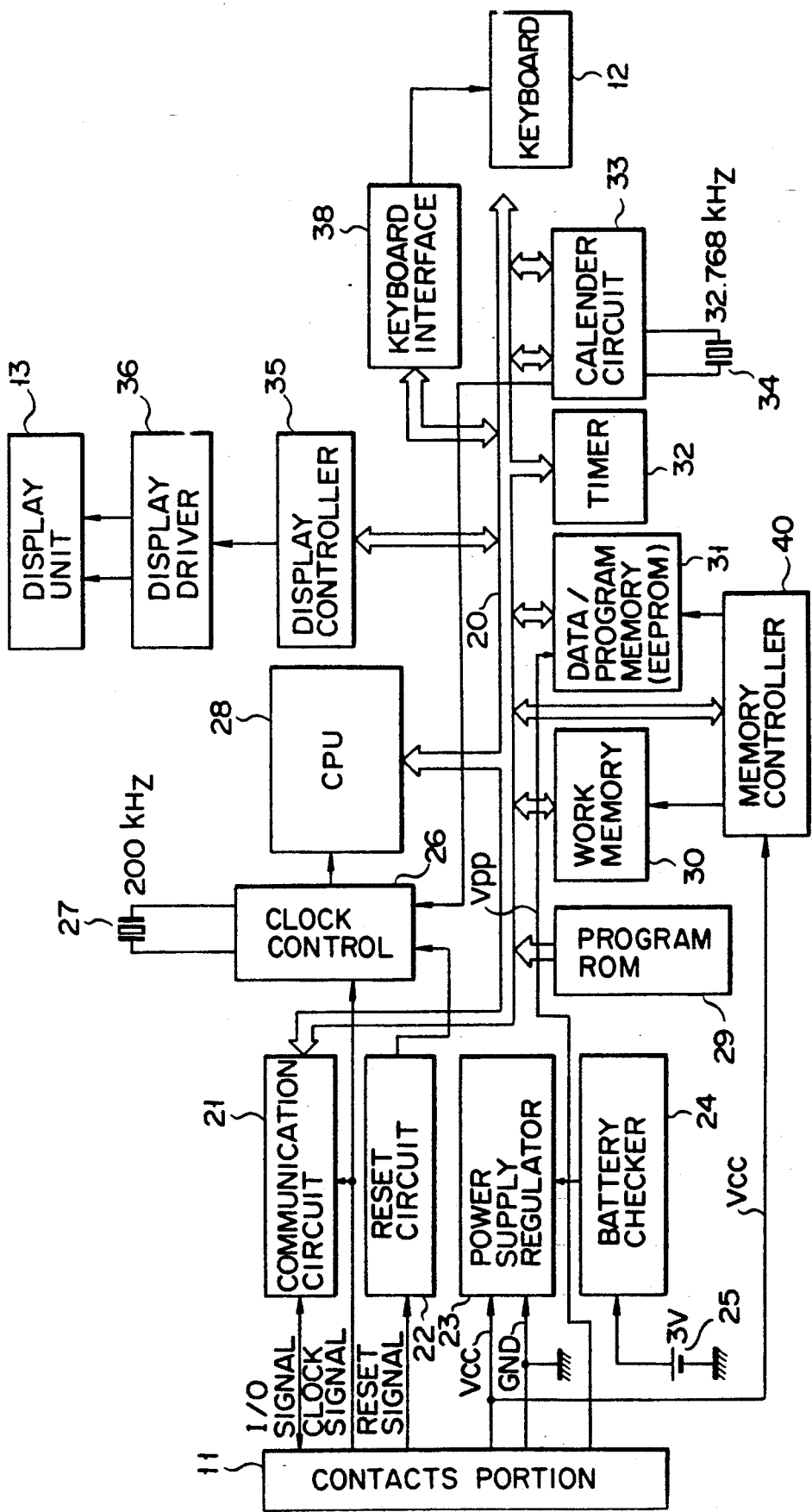

An electrical circuit of IC card 10 is arranged, as shown in FIG. 1. This circuit adopts a low-power consumption design using the CMOS techniques. The electrical circuit comprises contacts portion 11, communication circuit 21, reset circuit 22, power supply regulator 23, internal battery (built-in battery) 25 of, e.g., 3 V, battery checker 24 for checking if a voltage value of built-in battery 25 is equal to or higher than a rated value, clock controller 26, oscillator 27, as an arithmetic clock quartz oscillator, for outputting a signal at an oscillation frequency of 200 kHz (high-speed clock), control CPU (central processing unit) 28, mask ROM 29 for storing a basic program and data necessary for it, work memory 30, data memory 31, comprising an EEPROM, for storing an ID number, data, and the like, and a user program and the basic program, memory controller 40 for controlling mask ROM 29 and data memory 31, timer 32 used for measuring time during a processing operation, calender circuit 33, oscillator 34, as a fundamental clock quartz oscillator, for outputting a signal at an oscillation frequency of 32.768 kHz (low-speed clock), display controller 35, display driver 36 for driving display unit 13, and keyboard interface 38 as a key input circuit for keyboard 12.

Communication circuit 21, CPU 28, ROM 29, memory controller 40, work memory 30, data memory 31, timer 32, calender circuit 33, display controller 35, and keyboard interface 38 are connected to each other through data bus 20.

In a reception mode, communication circuit 21 converts serial I/O signals supplied from IC card reader/writer 16 through contacts portion 11 into parallel data, and outputs it onto data bus 20. In a transmission mode, circuit 21 converts parallel data supplied from data bus 20 into serial I/0 signals, and outputs them to IC card reader/writer 16 through contacts portion 11. In this case, the format content of conversion is determined by the terminal and IC card 10.

Reset circuit 22 generates a reset signal to start CPU 28 when the on-line mode is set.

Power supply regulator 23 switches a drive mode from one by built-in battery 25 to the other by an external power supply after the lapse of a predetermined period of time from the beginning of the on-line mode. When the off-line mode is set, i.e., an external voltage is decreased, regulator 23 switches the drive mode from one by the external power supply to the other by built-in battery 25.

Clock controller 26 appropriately switches the low- and high-speed clocks in the off-line mode in which a card operation is performed by built-in battery 25. For the purpose of power saving, after execution of a HALT command, controller 26 stops oscillator 27 which outputs a signal of an oscillation frequency of 200 kHz (high-speed clock), thereby stopping supply of a clock to CPU 28. Then, controller 26 waits in a perfect HALT state. Clock controller 26 basically selects a timepiece clock upon execution of the HALT command.

The basic program stored in mask ROM 29 includes a credit function, a drive program for I/O control, a calender function, and various other subroutine functions.

Data memory 31 consists of memory area 31a for storing a user application program, memory area 31b for storing user data such as a user's ID number, and memory area 31c for basic program data, which serves as a preservation data area for storing the basic program, as shown in FIG. 4.

The basic program stored in mask ROM 29 is loaded before the manufacture of an LSI chip. The user application program stored in data memory 31 is loaded from the terminal as part of card issuance processing at an issuer upon completion of the manufacture of a card.

Memory controller 40 monitors operations of mask ROM 29 and data memory 31 and controls data read/write access so as to prevent basic data from being destroyed by bugs in software or noise or an illegal program from entering a user area (to prevent the basic program from being illegally modified). The basic program is illegally modified if card 10 is, for example, a cash card, and the balance of the bank account of the card is not decreased although a user makes a purchase using this card.

In the on-line mode in which external power supply voltage Vcc is supplied, memory controller 40 enables data read/write access to user data memory area 31b. In the off-line mode in which external power supply voltage Vcc is not supplied, controller 40 disables data read/write access to user data memory area 31b.

Calender circuit 33 has a timepiece which can be desirably set and updated by a card holder, and a transaction timepiece in which a world standard time is set upon issuance of the card and cannot be changed.

Display controller 35 converts display data supplied from CPU 28 into a character pattern using a character generator (not shown) comprising an internal ROM, and displays the character pattern on display unit 13 using display driver 36.

Keyboard interface 38 converts an input operation at keyboard 12 into a corresponding key input signal, and outputs it to CPU 28.

Figure 5:
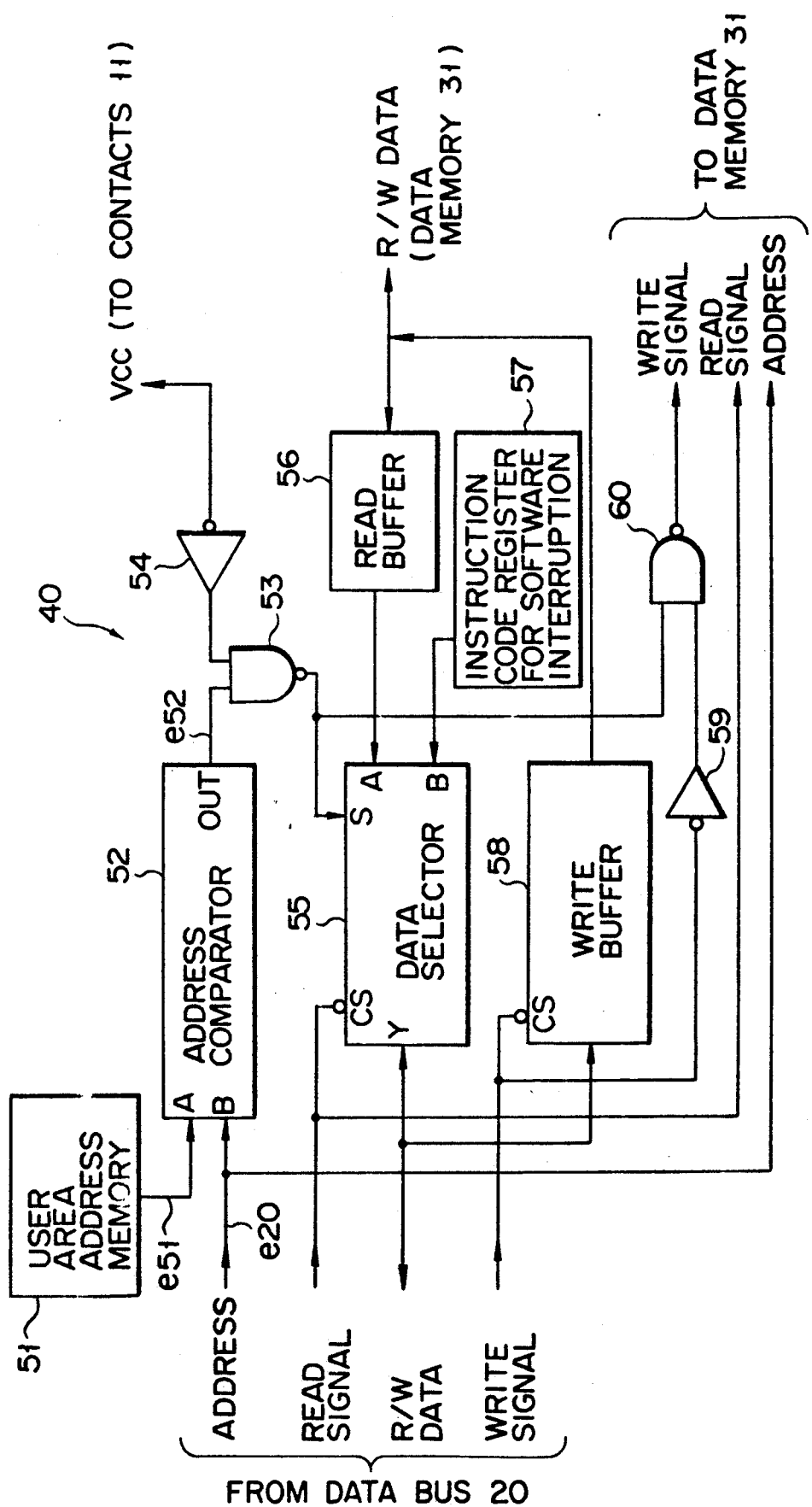

Memory controller 40 is arranged, as shown in FIG. 5. More specifically, controller 40 includes user area address memory 51 for storing several upper bits of a start address of user application program memory area 31a as data e51 indicating memory area 31a of data memory 31. Data e51 from user area address memory 51 is output to address comparator 52.

Address comparator 52 compares data e51 supplied from user area address memory 51 and several upper bits (upper 4 bits of 8-bit data) of access address e20 supplied from CPU 28 through data bus 20. When a coincidence between the two addresses is detected, comparator 52 outputs a "1" signal as coincidence signal e52; otherwise, it outputs a "0" signal as a noncoincidence signal.

The signal from address comparator 52 is supplied to one input terminal of NAND gate 53. The other input terminal of NAND gate 53 receives external power supply voltage Vcc from contacts portion 11 through inverter 54.

The output from NAND gate 53 is supplied to select terminal S of data selector 55. Chip select terminal of data selector 55 receives a read signal from CPU 28 through data bus 20, and data input terminal A receives read data from data memory 31, which is stored in read buffer 56. Data input terminal B of selector 55 receives a software interruption instruction code stored in software interruption instruction code register 57.

Output Y of data selector 55 is output to CPU 28 through data bus 20. The read signal supplied from CPU 28 through data bus 20 is directly output to data memory 31. Read buffer 56 stores read data supplied from data memory 31.

Software interruption instruction code register 57 stores a software interruption vector address "00" (start address of a software interruption instruction of mask ROM 29) for causing a software interruption to CPU 28. The software interruption instruction is part of the basic program, and is a program for invalidating (resetting) the presently executed program. This instruction is stored in mask ROM 29.

A write signal supplied from CPU 28 through data bus 20 is supplied to chip select terminal CS of write buffer 58, and is also supplied to one input terminal of NAND gate 60 through inverter 59. Write data supplied from CPU 28 through data bus 20 is supplied to the data input terminal of write buffer 58. The other input terminal of NAND gate 60 receives a signal from NAND gate 53, and the output from NAND gate 60 is output to data memory 31 as a write signal.

The operation of the above arrangement will be described below. Assume that a read address and a read signal are supplied from CPU 28 to memory controller 40 through data bus 20 in a read mode. More specifically, the read address is supplied to address comparator 52, and is also output to data memory 31. The read signal is supplied to chip select terminal CS of data selector 55, and is also output to data memory 31.

Address comparator 52 compares the read address with data from user area address memory 51. If comparator 52 determines that the read address falls within user application program memory area 31a, it outputs a "1" signal to NAND gate 53; otherwise, it outputs a "0" signal to NAND gate 53.

When external power supply voltage Vcc is supplied from IC card reader/writer 16 to memory controller 40 through contacts portion 11, a "0" signal is supplied to NAND gate 53 through inverter 54. When no external power supply voltage Vcc is supplied from IC card reader/writer 16 to memory controller 40 through contacts portion 11, a "1" signal is supplied to NAND gate 53 through inverter 54.

Therefore, when the read address is present in memory area 31a and no external power supply voltage Vcc is supplied (in the off-line mode), NAND gate 53 outputs a "0" signal as a read disable signal. When the read address falls outside memory area 31a or when the read address falls within memory area 31a and external power supply voltage Vcc is supplied (in the on-line mode), NAND gate 53 outputs a "1" signal as a read enable signal.

Thus, when the output from NAND gate 53 is the "1" signal, data selector 55 selects input terminal A; when it is the "0" signal, selector 55 selects input terminal B.

Data at an address of data memory 31 designated by the input read signal and the input read address is read out, and is output to read buffer 56. Thus, read data is stored in read buffer 56.

As a result, when input terminal A is selected, data selector 55 selects read data from data memory 31, which is stored in read buffer 56, and outputs it to CPU 28 through data bus 20. Upon reception of the read data, CPU 28 ends read processing.

When input terminal B is selected, data selector 55 selects the software interruption instruction code "00" stored in software interruption instruction code register 57, and outputs it to CPU 28 through data bus 20.

Upon reception of the software interruption instruction code "00", CPU 28 reads out a software interruption instruction program from mask ROM 29, and executes processing according to the readout program, i.e., processing for resetting the presently executed program.

In a write mode, CPU 28 supplies a write address, a write signal, and write data to memory controller 40 through data bus 20. The write address is supplied to address comparator 52, and is also output to data memory 31 through the write buffer 58. The write signal is supplied to chip select terminal CS of write buffer 58, and is also output to NAND gate 60 through inverter 59.

Address comparator 52 compares the input write address and data supplied from user area address memory 51. When the comparison result indicates that the write address falls within user application program memory area 31a, comparator 52 outputs a "1" signal to NAND gate 53; otherwise, it outputs a "0" signal to NAND gate 53.

When external power supply voltage Vcc is supplied from IC card reader/writer 16 to memory controller 40 through contacts portion 11, a "0" signal is supplied to NAND gate 53 through inverter 54. When no external power supply voltage Vcc is supplied from IC card reader/writer 16 to memory controller 40 through contacts portion 11, a "1" signal is supplied to NAND gate 53 through inverter 54.

Therefore, when the write address falls within memory area 31a (output from comparator 52="1") and no external power supply voltage Vcc is supplied (in the off-line mode; output from inverter 54="1"), NAND gate 53 outputs a "0" signal as a write disable signal. Otherwise, that is, when the write address falls outside memory area 31a (output from comparator 52="0") or when the write address falls within memory area 31a and external power supply voltage Vcc is supplied (in the on-line mode; output from inverter 54="0"), NAND gate 53 outputs a "1" signal as a write enable signal.

When the output from NAND gate 53 is the "1" signal, NAND gate 60 is kept enabled; when it is the "0" signal, NAND gate 60 is disabled.

As a result, when NAND gate 60 is enabled and the write signal from CPU 28 is supplied to data memory 31, data memory 31 stores write data supplied from write buffer 58 at the input write address. When NAND gate 60 is kept disabled and no write signal from CPU 28 is output, data memory 31 does not perform a storage operation of write data.

As described above, a user program is loaded in the rewritable data memory. In the read mode, when a read address corresponds to the user program in data memory 31 and no external power supply voltage is supplied, i.e., in the off-line mode, data read access to the data memory is disabled. When the external power supply voltage is supplied, i.e., in the on-line mode, data read access to the data memory is enabled. In the write mode, when a write address corresponds to the user program and no external power supply voltage is supplied, i.e., in the off-line mode, data write access to the data memory is disabled. When the external power supply voltage is supplied, i.e., in the on-line mode, data write access to the data memory is enabled.

Thus, there can be provided a highly reliable card which can prevent basic data from being destroyed and illegal software from entering by monitoring a user program operation without preparing a new LSI every time specifications are modified.

In the above embodiment, when an external power supply voltage Vcc is supplied, i.e., in the on-line mode, read/write access of the user program is enabled. However, the present invention is not limited to this. For example, when an internal power supply voltage is supplied, i.e., in the off-line mode, read/write access of the user program may be enabled.

In the above embodiment, an IC card is used. However, the present invention is not limited to this. The present invention can be applied to various other portable electronic devices as long as they have a data memory and a control element, and can selectively perform I/Os from an external device. The electronic device need not always have a card-like shape but may have other shapes such as a rod-like shape. The battery shown in FIG. 1 may be a solar cell.

As described above, according to the present invention, a portable electronic device which can prevent an increase in cost and can shorten a development period can be provided.

Additional advantages and modifications w 11 readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

I claim:

1. A portable electronic device, which has an on-line mode in which the device in use is connected to an external apparatus and has an off-line mode in which the device is operated while being disconnected from said external apparatus, comprising:
   data processing means having a function of basic processing for the device in said off-line mode and a function of user application processing in said on-line mode;
   a first memory means for storing a program for executing the basic processing;
   second memory means for storing a program for executing the user application processing;
   means for generating data indicating whether the device is in said on-line mode or in said off-line mode; and
   means, responsive to the generated data, for permitting access to the second memory means in said on-line mode, and for disabling access to the second memory means in said off-line mode.

2. A device according to claim 1, further comprising:
   means for receiving address information with respect to the access to said second memory means;
   means for detecting whether or not the address information received by said receiving means matches an address assigned to said second memory means, and for providing a result of the detection if said received information matches said assigned address; and
   means for generating an access signal according to the result provided by said detecting means and the data generated by said generating means, said access signal indicating that said second memory means is accessible.

3. A device as recited in claim 1, wherein said first memory means is incorporated in a ROM.

4. A device as recited in claim 1, wherein said second memory means is incorporated in an EEPROM.

5. A device as recited in claim 1, further comprising contact means for exchanging data between the portable electronic device and the external apparatus in the on-line mode.

6. A device as recited in claim 1, further comprising a keyboard for inputting data in the off-line mode.

7. A device as recited in claim 1, further comprising means for displaying data in the off-line mode.

8. A portable electronic device, which has an on-line mode in which the device in use is connected to an external apparatus and has an off-line mode in which the device is operated while being disconnected from said external apparatus, the portable electronic device comprising:
   a data processing unit for carrying out basic processing for the device in said off-line mode and user application processing in said on-line mode;
   non rewritable first memory means for storing program instructions for executing basic processing;
   rewritable second memory means for storing program instructions for executing user applications program; and
   means for permitting access to the second memory means during the on-line mode, and disabling access to said second memory means during the off-line mode, said portable electronic device being incorporated in an IC card powered by said external apparatus in the on-line mode, and powered by a built-in battery in the off-line mode, said means for permitting comprising:
   comparison means for comparing a start address of the user application program, stored in said second memory means, and an address output from said data processing unit, and for, when a coincidence between the two addresses is detected, outputting a coincidence signal, and
   circuit means for, when the coincidence signal is output and said IC card is powered by the built-in battery, disabling said data processing unit from accessing said second memory means, and for, when the coincidence signal is output and said IC card is powered by said external apparatus, enabling said data processing unit to access said second memory means.

9. A device according to claim 8, wherein said second memory means includes an electrically-erasable programmable ROM.

10. A device according to claim 9, wherein said electrically-erasable programmable ROM stores the program for the user application processing and a user's identification number.

11. A device according to claim 8, wherein said first memory means includes a ROM.

12. A device according to claim 11, wherein said ROM stores the program for executing the basic processing and data used when the program is executed.

13. A device according to claim 8, wherein the function of said basic processing includes a credit transaction function.

14. A device according to claim 8, wherein the function of said basic processing includes a calender function.

15. A device according to claim 14, further comprising:
a calendar circuit including a first timepiece which is adjustable by a user, and a second timepiece which is adjustable only in said on-line mode by an issuer of said IC card.

16. A portable electronic device, which has an on-line mode in which the device in use is connected to an external apparatus and has an off-line mode in which the device is operated while being disconnected from said external apparatus, the portable electronic device comprising:
a data processing unit for carrying out basic processing for the device in said off-line mode and user application processing in said on-line mode;
nonrewritable first memory means for storing program instructions for executing basic processing;
rewritable second memory means for storing program instructions for executing user applications program;
means for permitting access to the second memory means during the on-line mode, and disabling access to said second memory means during the off-line mode; and
a calendar circuit including a first timepiece which is adjustable by a user, said calendar circuit performing a calendar function as a function of said basic processing, the portable electronic device being incorporated in an IC card, the calendar circuit also including a second timepiece which is adjustable only in said on-line mode by an issuer of said IC card.

17. A device according to claim 16, wherein said second memory means includes an electrically-erasable programmable ROM.

18. A device according to claim 17, wherein said electrically-erasable programmable ROM stores the program for the user application processing, and a user's identification number.

19. A device according to claim 16, wherein said first memory means includes a ROM.

20. A device according to claim 19, wherein said ROM stores the program for executing the basic processing and data used when the program is executed.

21. A device according to claim 16, wherein the function of said basic processing includes a credit transaction function.

22. A device of claim 16, which is incorporated in an IC card powered by said external apparatus in the on-line mode, and is powered by a built-in battery in the off-line mode.

23. A device according to claim 22, wherein said means for permitting comprises:
comparison means for comparing a start address of the user application processing program, stored in said second memory means, and an address output from said data processing unit, and for, when a coincidence between the two addresses is detected, outputting a coincidence signal; and
circuit means for, when the coincidence signal is output and said IC card is powered by the built-in battery, disabling said data processing unit from accessing said second memory means, and for, when the coincidence signal is output and said IC card is powered by said external apparatus, enabling said data processing unit to access said second memory means.

* * * * *